United States Patent Office 2,998,569
Patented Aug. 29, 1961

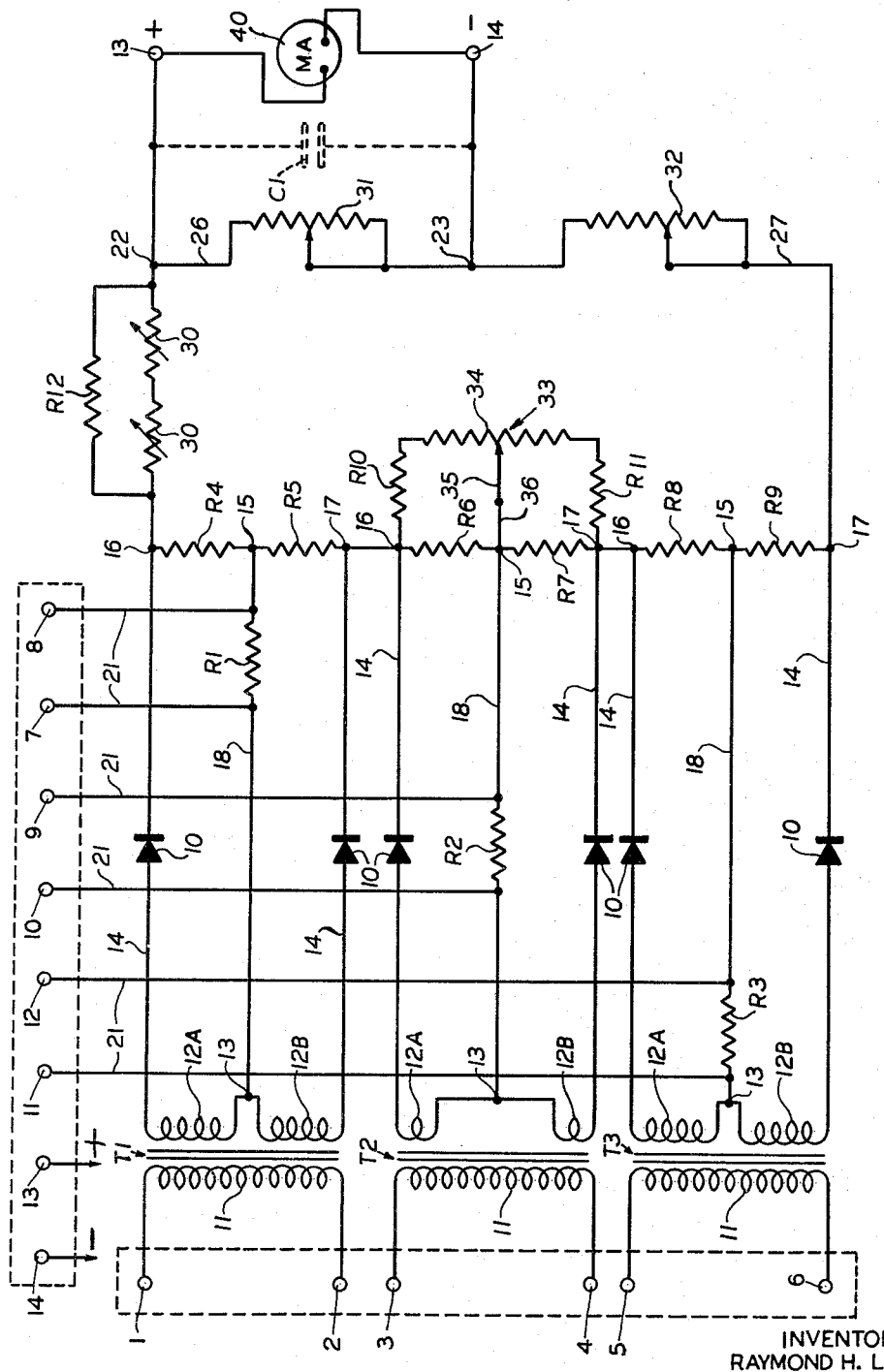

2,998,569
POLYPHASE POWER TOTALIZING AND INDICATING APPARATUS
Raymond H. Legatti, Bellport, and John F. Hysler, Sayville, N.Y., assignors to Electromagnetic Industries, Inc., Sayville, N.Y., a corporation of New York
Filed Oct. 20, 1960, Ser. No. 63,807
8 Claims. (Cl. 324—107)

This invention relates to the measurement of power in polyphase alternating current systems and, more particularly, to a novel means for measuring the true power, as distinguished from kilovoltamperes, of a polyphase alternating current system.

Measurement of A.C. power or kw. has involved a rather complicated and extensive array of instruments. Generally, these measurements are effected by utilizing individual instrumentation in each phase of the circuit. Even with such arrangements, it is difficult to obtain a correct measurement of the totalized true power, or kilowatts (as distinguished from the kv.-a.), of the polyphase system.

The present invention is directed to a measuring arrangement involving a wattmeter transducer which is a three-phase totalizing device for the watts of power, and which converts the totalized true power of the three phases into a proportional direct current signal which is utilized to energize a measuring instrument, which may be of the D'Arsenval type. For example, it may be an ammeter, a milliammeter or the like.

More specifically, the invention transducer or measuring arrangement utilizes the usual potential and current transformers associated with each phase of a polyphase, such as a three-phase, A.C. system. The secondary winding of each potential transformer is center tapped, and the two halves of each secondary winding are connected in a bridge arrangement including a pair of diodes and a pair of resistors forming, with the two halves of the secondary winding, the legs of the bridge circuit. The terminal resistor of the respective current transformer secondary winding is in series in the diagonal of the bridge circuit.

With this arrangement, in the no load condition, equal direct current voltages appear across the two resistors of the bridge circuit and no current flows through the current transformer terminating resistor. However, upon the application of load to the external circuit, there is a current flow through the current transformer terminating resistor and this produces a direct current signal output from each bridge.

With this arrangement, the signal appearing across the output terminals will represent the true power, if the current is in phase with the voltage in the external circuit, or will represent EI–COS $\phi$, or true watts, if the current of the external circuit is displaced in time with respect to the voltage. However, these conditions hold true only if the external voltage remains constant. To compensate for this, the three potential transformer secondaries are connected in open delta, the instantaneous polarity of phase 2 is reversed 180° with respect to the other two phases, and the secondary voltage of the potential transformer of phase 2 is reduced so that it is substantially 58 percent of the secondary voltages of the other two phases.

The resultant A.C. component, which appears as a single phase signal at the output of the measuring circuit, is a corrective voltage proportional to a variation in any one of the three-phase primary voltages. This output A.C. voltage is used to modulate a pair of carefully selected varistors connected in series in the measuring circuit extending from the terminals of the series connected bridge resistors, and a shunting resistor is connected in parallel with the series connected varistors. Thus, when the external voltage is reduced, the A.C. modulating voltage across the varistors is reduced, and the dynamic resistance of the varistors is increased. This limits the current flow into the indicating instrument by an amount predetermined by other circuit components used for calibration adjustments. Further means are provided to correct for bridge unbalance due to even order harmonics, whose effect is to produce a false signal causing the indicating meter to read in the no load condition.

For an understanding of the principles of the invention, reference is made to the following description of a typical embodiment thereof as illustrated in the drawing. In the drawing, the single figure is a schematic wiring diagram of apparatus embodying the invention.

Referring to the drawing, the apparatus of the invention is illustrated as arranged to measure the true power of a three-phase system, and is shown as including potential transformers T1, T2, and T3 having primary windings 11 connected across the respective three phases and center tapped secondary windings having sections 12a and 12b interconnected at junction points 13. It will be noted that the instantaneous polarity of the secondary winding of transformer T2 is reversed with respect to the instantaneous polarity of the secondary windings of transformers T1 and T3. It should further be observed that secondary windings 12a and 12b of transformer T2 are substantially shorter than the corresponding secondary windings of transformers T1 and T2, the ratio being such that the secondary winding of transformer T2 develops substantially 58 percent of the voltage of the secondary windings of transformers T1 and T3.

Conductors 14, 14 connect the outer terminals of each secondary winding to respective junction points 16, 17, a diode 10 being connected in each conductor 14. A pair of resistors R4 and R5 is connected in series between the terminals 16, 17 associated with transformer T1, and resistors R6 through R9 are similarly connected between the respective terminals 16 and 17 of the other two secondary circuits. Each pair of series connected resistors is interconnected at a junction point 15. A conductor 18 connects each center tap 13 to the associated junction point 15, and a current transformer terminal resistor, such as R1, R2, or R3 is connected in series in each conductor 18. Conductors 21 apply the secondary voltage of each current transformer (not shown) across the respective resistors R1, R2, and R3. The external connections to the potential transformer are made at terminals 1 through 6 of a terminal strip 20, and the secondaries of the current transformers are connected to terminals 7 through 12 of a terminal strip 25.

Except for the reversal of polarity of the secondary winding of transformer T2, and the reduced secondary voltage thereof, the connection of the secondary windings of all the transformers are identical. It thus will be sufficient to refer to the connections of the transformer T1. Referring to these connections, it will be noted that the secondary windings 12a and 12b, the diodes 10, and the resistors R4 and R5 form a bridge circuit having a diagonal 18 connected between center tap 13 and junction point 15. Current transformer terminal resistance R1 is included in this diagonal. It should further be noted that all of the resistors R4 through R9 are connected in series with each other and that the terminal 16 of resistor R4 and the terminal 17 of resistor R9 comprise the output terminals for the effective secondary winding voltage of the combination of the three phases.

With these connections, and again referring to phase 1 connected to potential transformer T1, in the no load condition, D.C. voltages appearing across resistors R4 and R5 are equal and there is no current flow between the output terminals of the system. However, if the external system has a load applied thereto, there is a current flowing through the current transformers and thus this current, in phase 1, appears as a signal voltage across resistor R1. If the external load is resistive, the signal voltage will be in phase with the reference voltage and it will add to and subtract from the respective opposite halves of the bridge. This will produce a D.C. component in the meter circuit that is proportional to the external A.C. current. On the other hand, if the external load is at least partly reactive, the signal voltage appearing across resistor R1 is displaced in time from the reference voltage, and the effective voltage developed across resistor R1 is equal to EI–COS $\phi$, or the true watt or kilowatt power taken by the load on phase 1.

As the above-mentioned result is true only if the external voltage remains substantially constant, a compensating means is provided. This compensating means comprises the connection of the three secondary windings of the potential transformers in open delta. Furthermore, the instantaneous polarity of the secondary winding of transformer T2 is reversed 180° with respect to that of the secondary windings of transformers T1 and T3. In addition, the secondary voltage developed by transformer T2 is reduced to substantially 58 percent of the secondary voltages of transformers T1 and T3.

The resultant A.C. signal which appears as a single phase signal at the output terminals 16, 17 of the open delta connection is a corrective voltage which is proportional to a variation in the primary voltage of any one of the three phases, as applied to the primary windings 11 of transformers T1, T2, and T3. This A.C. signal voltage is utilized to modulate varistors 30, 30 which are connected in series between one output terminal 16 and a junction point 22. Varistors 30 are chosen to have the correct slope and dynamic resistance at the selected operating level. A shunting resistor R12 is connected in parallel with series connected varistors 30, and is selected to have the proper characteristics to dampen the effective voltage compensation.

Varistors 30, as will be noted, are connected in series in the output circuit of the system, between the terminals 16 and 17, as junction point 22 is connected to a junction point 23 by a conductor 26 and a rheostat 31, and junction point 23 is connected to output terminal 17 by a conductor 27 and a rheostat 32. When the voltage of the system is reduced, the A.C. modulating voltage across the varistors is reduced and the dynamic resistance of the varistors increases. This limits the current flow into the indicator by an amount predetermined by resistor R12 and potentiometers 31 and 32. Potentiometer 31 is connected in series in conductor 26 and potentiometer 32 is connected in series in conductor 27. Potentiometers 31 and 32 are used for calibration adjustment.

It will be observed that a resistor R10, a resistor R11, and a potentiometer 33 are associated with the terminals 16 and 17 of phase 2. Resistors R10 and R11 are connected between the respective terminals 16 and 17 of phase 2 and the resistance winding 34 of potentiometer 33. The adjustable tap 35 of potentiometer 33 is connected to the junction point 15 of resistors R6 and R7 through a conductor 36. The resistors R10 and R11, and the potentiometer 33, are provided to correct for any bridge unbalance due to even order harmonics appearing in the A.C. input voltage. The effect of these harmonics is to produce a false signal, causing the indicating meter 40 to have a reading even in the no load condition. It will be noted that this indicating meter 40 is connected between junction points 22 and 23 and to terminals 13 and 14 of terminal strip 25. The meter 40 gives a reading proportional to the true watts or kilowatts of power utilized in the external circuit connected to terminals 1 through 6.

In the event the apparatus is used with 60-cycle A.C. systems, a condenser C1 may be connected between junction points 22 and 23 in parallel with potentiometer 31.

While a specific embodiment of the invention has been shown and described in detail to illustrate the application of the invention principles, it will be understood that the invention may be embodied otherwise without departing from such principles.

What is claimed is:

1. Apparatus for totalizing the power of a three-phase A.C. system comprising, in combination, three potential transformers each having a primary winding connected across the different phase, the secondary windings of said potential transformers being center-tapped and connected in open delta; one secondary winding being connected with reverse polarity relative to the other secondary windings and having an output voltage equal to substantially 58 percent of the output voltages of each of the other secondary windings; means forming full wave rectifying bridge circuits, each including one of said secondary windings, a pair of series-connected bridge resistors, diode means, and a terminal resistor of a current transformer in the associated phase connected between the center tap of the secondary winding and the junction point of the associated bridge resistors and constituting the diagonal of the respective bridge circuit; said pairs of bridge resistors being connected in series with each other between the pair of output terminals of said delta connection; and a direct current indicating instrument connected between said delta output terminals; whereby, an external load on any phase will effect a bridge unbalance resulting in a corresponding potential appearing between said output terminals.

2. Apparatus for totalizing the power of a three-phase A.C. system comprising, in combination, three potential transformers each having a primary winding connected across a different phase, the secondary windings of said potential transformers being center-tapped and connected in open delta; one secondary winding being connected with reverse polarity relative to the other secondary windings and having an output voltage equal to substantially 58 percent of the output voltages of each of the other secondary windings; means forming full wave rectifying bridge circuits each including one of said secondary windings, a pair of series-connected bridge resistors, diode means, and a terminal resistor of a current transformer in the associated phase connected between the center tap of the secondary winding and the junction point of the associated bridge resistors and constituting the diagonal of the respective bridge circuit; said pairs of bridge resistors being connected in series with each other between the pair of output terminals of said delta connection; a direct current indicating instrument connected between said delta output terminals; line voltage compensating means connected in series with said instrument between said delta output terminals and effective, upon a reduction in line voltage, to reduce the current flow through said instrument by a corresponding amount; whereby an external load on any phase will effect a bridge unbalance resulting in a corresponding potential appearing between said output terminals.

3. Apparatus as claimed in claim 2 in which said line voltage compensating means comprises at least one varistor.

4. Apparatus as claimed in claim 2 including a shunting resistor connected in parallel with said compensating means and effective to dampen the effective voltage compensation of said compensation means.

5. Apparatus as claimed in claim 2 including a pair of calibration adjusting means respectively connected in parallel and in series with said indicating instrument.

6. Apparatus as claimed in claim 5 in which said calibration adjusting means comprises a pair of potentiometers.

7. Apparatus as claimed in claim 2 including means in circuit connection with said bridge resistors and effective to correct for any bridge unbalance due to even order harmonics in the A.C. input voltage.

8. Apparatus as claimed in claim 7 in which said correcting means comprises a pair of resistances each having one end connected to a terminal of said one secondary winding; a potentiometer winding connected between the other ends of said resistances; and a potentiometer tap connected to the junction of the series connected bridge resistors associated with said one secondary winding.

References Cited in the file of this patent

UNITED STATES PATENTS

| | | |
|---|---|---|
| 1,871,710 | Lenehan | Aug. 16, 1932 |
| 2,588,155 | Ofverholm | Mar. 4, 1952 |